Figure 1:
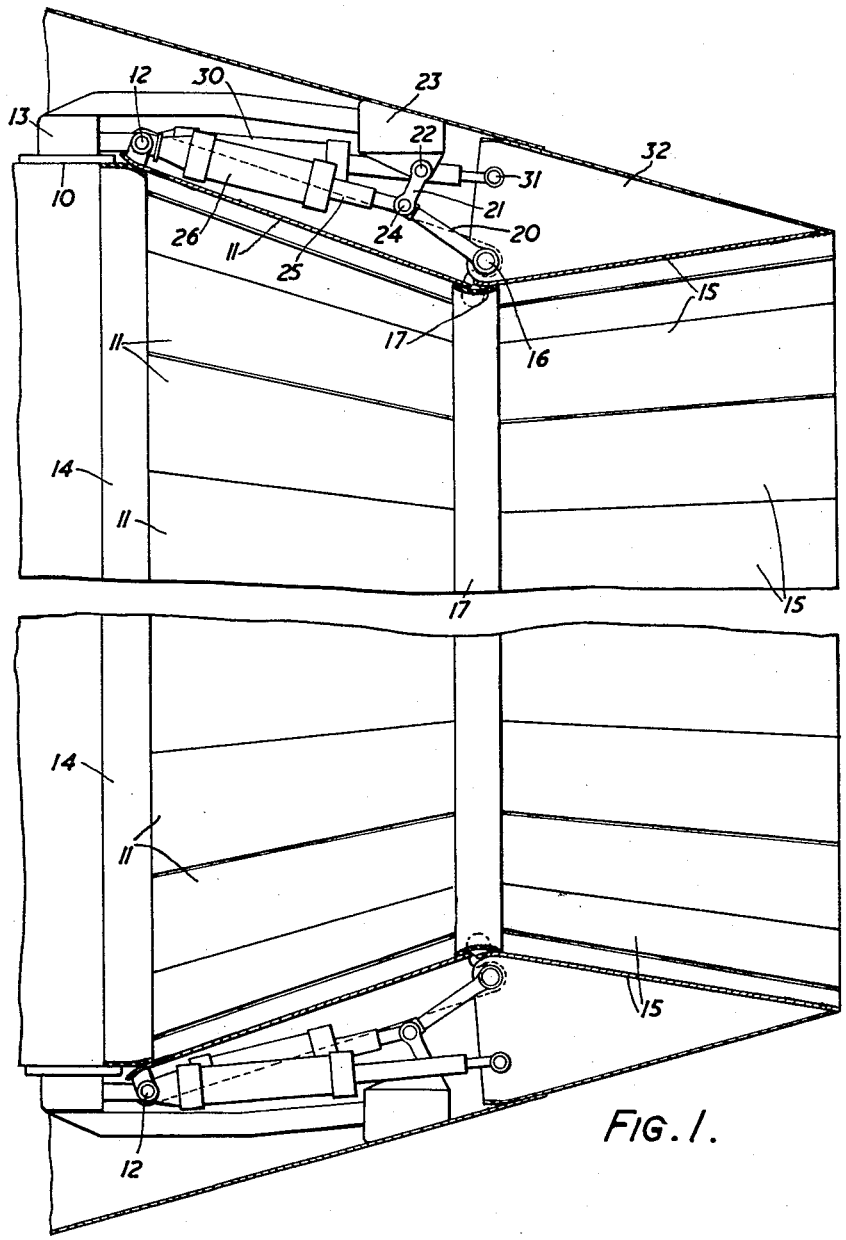

United States Patent Office

2,995,010
Patented Aug. 8, 1961

2,995,010
ADJUSTABLE PROPULSION NOZZLES
William Hammett Arscott, Woldingham, England, assignor to The De Havilland Engine Company Limited, Leavesden, England, a company of Great Britain
Filed Jan. 16, 1958, Ser. No. 709,316
Claims priority, application Great Britain Jan. 17, 1957
8 Claims. (Cl. 60—35.6)

This invention relates to adjustable propulsion nozzles more especially for use in jet propulsion apparatus for aircraft, the term aircraft being used herein to include both piloted and unpiloted aircraft and missiles propelled partially or wholly by one or more propulsion jets.

It is an object of the invention to provide an adjustable propulsion nozzle the form of which can be varied at will, and preferably through an infinite number of intermediate positions, from the convergent form suitable for subsonic conditions of exhaust gas flow to the convergent-divergent form suited to supersonic conditions of gas flow, and also to enable the throat area of the nozzle to be varied. The ability to vary the throat area is of advantage in certain supersonic applications and also in combustion turbine engines having provision for reheat or after burning. An adjustable propulsion nozzle assembly according to the present invention comprises a fixed non-adjustable tubular nozzle to the rear edge of which are hinged, about axes tangential to a circle or circles having the axis of the fixed nozzle as centre, the forward ends of a series of flaps extending rearwardly from their hinged ends, and with their adjacent edges arranged to overlap in the manner of petals and slide over one another in a circumferential sense, and including a second series of flaps lying downstream of the first series of flaps and means for controlling independently the inclination of each series of flaps.

When the second flaps are directly hinged to the rear ends of the first flaps the positions of the hinged forward ends of the second series of flaps determine the throat area of the nozzle when in convergent-divergent form. Moreover the control means for the flaps is preferably capable of locating the flaps in a large number of different positions between the limits of adjustment. Thus it will be seen that when in convergent-divergent form a wide range of possible throat areas can be obtained, for any selected exit area.

According to a preferred feature of the invention the means controlling the inclination of the flaps comprises a series of control elements, each connected between a moving part of a flap displaced from the hinge connection at its forward end, and a fixed structure surrounding the flaps.

Thus in the case of the second series of flaps, a series of control elements may be connected respectively between a point on one of these flaps displaced radially outwards from its hinged connection with one of the first series of flaps, and a point on a fixed structure lying outside this second series of flaps.

Moreover each control element will then preferably be connected at one end to a point on or adjacent to the hinged connection between the forward end of the associated first flap and the fixed tubular nozzle, such that the inclination of each second flap with respect to the first is unaffected by alterations in the inclination of the first flap.

The control elements conveniently comprise pneumatic or hydraulic rams.

Moreover some or all of the control elements may be associated with a toggle mechanism, including two links pivotally attached to one another, thus increasing the mechanical advantage and also providing a self-locking effect in different operating positions.

According to another preferred feature of the invention the inclination of the second series of flaps is controlled by a parallel motion linkage including two parallel links one pivotally mounted on the hinged forward end of one of the first series of flaps, and the other link pivotally attached to the first flap at a point spaced from this hinge, the second flap being attached to or formed integral with this second link.

Figure 2:
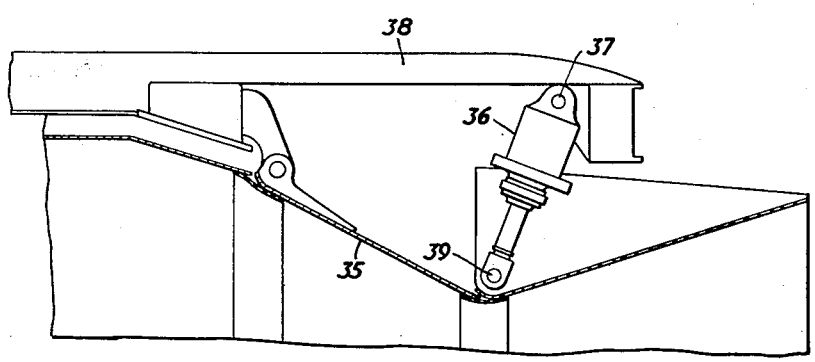
Figure 3:
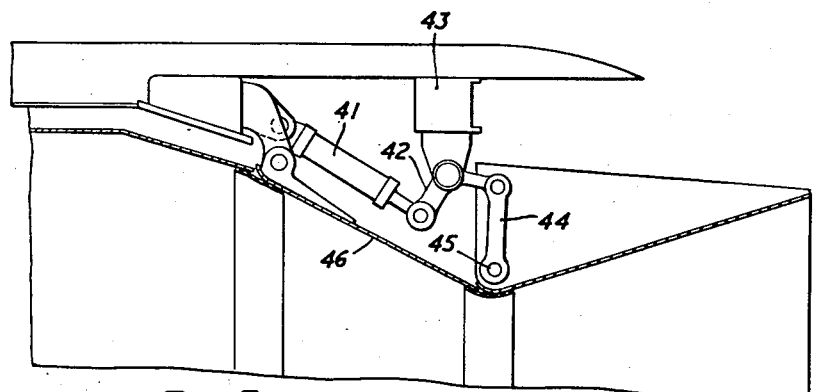
Figure 4:
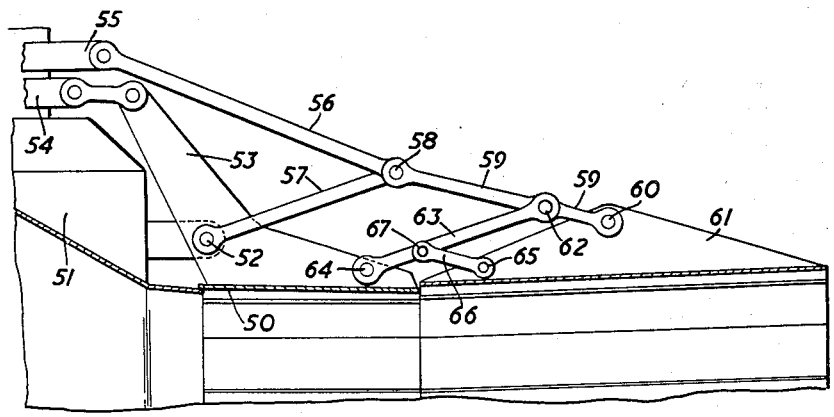
Figure 5:
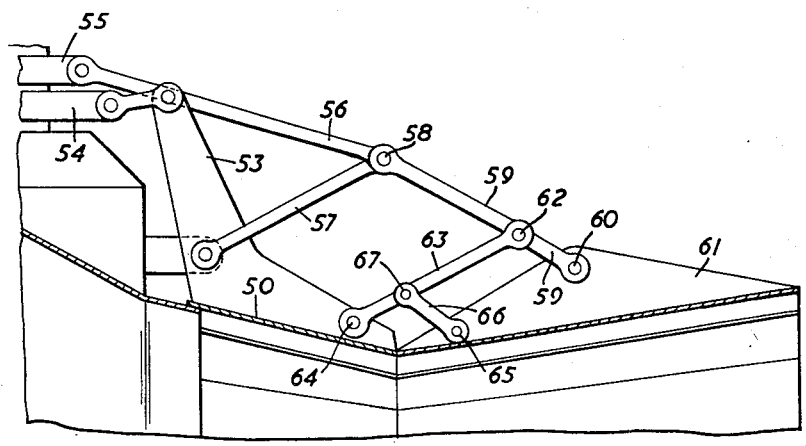

The invention may be performed in various ways and some specific examples will now be described with reference to the accompanying drawings in which:

FIGURE 1 is a sectional side elevation through the rear end of an adjustable exhaust nozzle, FIGURES 2 and 3 are fragmentary sectional side elevations through alternative forms of adjusting mechanism according to the invention and FIGURES 4 and 5 are similar fragmentary sectional side elevations showing two positions of yet another form of adjusting mechanism.

In the first example illustrated in FIGURE 1 the fixed tubular nozzle 10 is of cylindrical form and a first series of flaps 11 are hingedly attached at their forward ends to the nozzle on tangentially hinged axes 12 supported from a stationary structure 13 attached to and surrounding the rear end of the fixed nozzle. In each case the hinge axis lies a short distance outside the forward end of the flap adjacent to the fixed nozzle and this part of the flap is radiused on the axis of the hinge so that a small clearance is maintained when the flap pivots. A flexible cover ring 14 is attached to the extreme rear end of the fixed nozzle 10, and engages the flaps 11 to form a substantially fluid-tight seal.

To the rear ends of each pair of these first series of flaps 11 is hingedly attached a second somewhat similar flap 15, each second hinge axis 16 being substantially parallel to the corresponding first hinge axes at the forward ends of the respective pair of first flaps 11. Each of these second hinges 16 is also arranged to lie a short distance outside the general planes of the flaps, which thus provide a substantially continuous inner surface which is rendered substantially gas tight by a resilient cover ring 17. As in the case of the first flaps, the second series are arranged to overlap and slide over one another along their edges thus forming a complete duct of variable form.

The angle of inclination of the flaps with respect to the common axis of the nozzle is preferably controlled by a series of control elements consisting of hydraulic rams and toggle linkage. In the example illustrated in FIGURE 1 the inclination of each of the first series of flaps is adjusted by a toggle linkage including a pair of links 20, 21 pivotally connected to one another and at their free ends respectively to one of the hinge connections 16 between the flaps of the first and second series, and at the other end pivotally connected at 22 to a rigid structure 23 surrounding the assembly. The mid-point 24 of this toggle linkage is connected to the piston rod 25 of a hydraulic ram 26 the other end of which is pivotally connected to the associated hinge 12 at the forward end of the flap 11 of the first series. Thus movements of the ram to expand or contract, cause the angle between the members 20, 21 of the toggle linkage to increase or decrease and so cause the first flap 11 to swing towards or away from the common axis of the nozzle.

Since one end of the toggle linkage is connected to the hinge connection 16 between the first and second flaps it will be seen that this mechanism will not in any way affect or be affected by the position and attitude of the second flap.

A series of rams 26 are provided around the nozzle assembly, one ram connected to each flap, and all the rams are connected hydraulically to one another and are thus moved in unison. The rams may be controlled by hydraulic valve mechanism including follow up linkages of known kind to provide accurate control of the positions of the flaps at any desired angular inclination within their range of movement.

The position of the second series of flaps in this example is controlled by a series of extensible control elements comprising the hydraulic rams 30 each pivotally connected at its forward end to a hinge closely adjacent to the forward hinged axis 12 of the associated first flap, the ram piston being pivotally connected to a point 31 of the second flap remote from its hinge axis 16. To this end each second flap is preferably provided with an integral flange 32 or other structure extending radially outwards from the common axis of the nozzle and the hydraulic ram is connected to the hinge pivot 31 on this flange appreciably spaced from the hinge axis 16 so as to afford an appreciable lever arm.

It will be seen that since the forward end of each ram 30 is pivotally connected to the fixed nozzle structure adjacent to the hinge axis 12 at the forward end of the first flap, the effective length of the ram 30 will not be affected by the movement of the first flap. The inclination of the second flaps in relation to the first therefore depends purely on the adjustment of the second rams 30.

Means may be provided for locking the rams and hence the various flaps in several selected positions within the range of adjustment. Such means are well known in themselves and will therefore not be described in detail. Alternatively, the flaps may be infinitely adjustable. It will be understood that the rams of each series of flaps will be operated simultaneously, and in unison.

Various alternative adjusting mechanisms may be used to control the inclinations of the flaps. Thus in one possible modification illustrated in FIGURE 2 the first series of flaps 35 may be controlled by a series of simple hydraulic jacks 36 pivotally connected between points 37 on a surrounding fixed structure 38 and the hinged joints 39 at the downstream ends of the first flaps.

The second series of flaps 40 would be adjusted independently as in the first example. In a further possible modification illustrated in FIGURE 3 each hydraulic ram 41 is connected to a bell crank lever 42 pivoted on the surrounding fixed structure 43 the other arm of the bell crank lever being pivotally connected to a link 44 attached at its other end to one of the hinges 45 at the downstream ends of the first series of flaps 46.

In the modified control system illustrated in FIGURES 4 and 5 the object is to obtain independent control of the attitudes of the two series of flaps in such a way that the angular attitude of the second series of flaps in relation to the axis of the complete assembly will be unaffected by movements of the first series of flaps. To this end the first series of flaps 50 are each pivotally connected to the fixed nozzle structure 51 at a hinge pin 52, and each flap is rigidly connected to a lever 53, whose position can be adjusted by a longitudinally movable control member 54 such as a hydraulic or screw jack to control the angular position of the flap. A second longitudinally movable control member 55 is pivotally attached to a link 56, which is in turn pivoted at 58 to an extensible control element comprising a first link 57 and a second link 59. The first link 57, which is free to pivot at one end on the hinge pin 52 is pivoted at its other end to the link 56 at 58. The link 59 is pivoted at one end to the junction 58, and at the other end to a point 60 on one of the second series of flaps 61. To an intermediate point 62 on this link 59 there is pivotally connected one end of a link 63, the other end of which is pivotally attached to the respective first flap 50 at a point 64. The distance between the pivots 52 and 64 is equal to the distance between pivots 58 and 62, and the link 57 is of the same length as link 63, the system thus forming a parallelogram linkage, the angular attitude of links 57 and 63 being controlled solely by the position of control member 55, and unaffected by movements of the first flap 50.

The second flap 61 is connected to link 59 at the point 60, and is connected at another point 65 to a link 66 which is pivotally attached to an intermediate point 67 on the link 63, the dimensions of the parts being such that the pivots 65, 67, 62, 60, also comprise a parallelogram linkage. The second flap 61 is thus maintained at all times in the same angular attitude or position as the link 63, and hence as the link 57 which is in turn controlled by member 55.

One possible alternative position of the various parts is illustrated in FIGURE 5. It will be appreciated that by providing a stop or other limit to the movement of control member 55 in the right hand direction in the drawings, it is possible to limit the inward deflection of the second series of flaps. In practise the stop may be so positioned that the second series of flaps cannot become inclined inwards towards the axis of the nozzle, thus ensuring that the throat or smallest cross section of the nozzle assembly is always at the rear ends of the first series of flaps.

What I claim as my invention and desire to secure by Letters Patent is:

1. A propulsion nozzle assembly comprising a fixed non-adjustable tubular nozzle, a first series of flaps each hingedly connected at its forward end to the tubular nozzle on an axis tangential to a circle concentric with the axis of the fixed nozzle, and a second series of flaps lying downstream of the first series of flaps, each second series flap being connected to one of said first series flaps for pivotal movement about the forward end of said secone series flap, means for controlling the inclination of the first series of flaps, said means comprising a first series of control elements each connected between a fixed structure rigid with the fixed nozzle and a point on one of the first series of flaps displaced from the hinged connection at its forward end, and means for correlating the movement of said second series of flaps with and during movement of said first series which comprises a second series of control elements, each control element being connected between a pivot point substantially coaxial to the hinge axis of one of said first series of flaps and a fixed pivot point on the flap of said second series connected thereto, said fixed pivot point being displaced from the forward end of said second series flap.

2. A propulsion nozzle assembly as claimed in claim 1 in which one of said second series of flaps and one of said first series control members are pivotally connected to each of said first series flaps at a common point located near the downstream end of said first series flap, and said second series of control members comprises a hydraulic cylinder and a piston slidable in said cylinder, said common point, said hinge axis, and the point at which said second series control member is attached to said second series flap forming a triangle which is rigid for any given position of said piston in said cylinder, so that in the absence of any change in said piston position said second series flaps will swing with said first series flaps and maintain a substantially constant angle therebetween.

3. A propulsion nozzle assembly as claimed in claim 1 in which each of said second series of control elements comprises first and second rigid links, one end of each link being pivotally connected to one end of the other link while the remaining ends of said links are connected to said coaxial pivot point and said fixed pivot point respectively, and said links constitute two elements of a parallel motion linkage by means of which each flap in said second series is connected to a flap in said first series so that the angular position of said first series flap with respect to the axis of the nozzle may be altered without changing the angular position of said second series flap with respect to said nozzle axis.

4. A propulsion nozzle assembly comprising a fixed non-adjustable tubular nozzle, a first series of flaps each hingedly connected at its forward end to the tubular nozzle on an axis tangential to a circle concentric with the axis of the fixed nozzle, and a second series of flaps lying downstream of the first series of flaps, each second series flap being connected to one of said first series of flaps for pivotal movement about the forward end of said second series flap, means for controlling the inclination of the first series of flaps, said means comprising a first series of control elements each connected between a fixed structure rigid with the fixed nozzle, and a point on one of the first series of flaps displaced from the hinged connection at its forward end, and means for maintaining a desired position of said second series of flaps during the movement of said first series which comprises a series of rigidly extensible control elements, each control element being connected between a pivot point substantially coaxial to the hinge axis of one of said first series of flaps and a fixed pivot point on the flap of said second series connected thereto, said fixed pivot point being displaced from the forward end of said second series flap, and means for regulating the extension of said extensible elements.

5. A propulsion nozzle assembly as claimed in claim 4, in which each of said series of extensible control elements comprises first and second rigid links, one end of each link being pivotally connected to one end of the other link, while the remaining end of the first link is connected to said coaxial pivot point and the remaining end of said second link is connected to said fixed pivot point.

6. A propulsion nozzle assembly as claimed in claim 5 in which said means for regulating the extension of said rigidly extensible member comprises a control member for adjusting the inclination of each second series flap, said control member being connected between an anchorage point fixed with respect to said fixed nozzle and the pivotal connection between said links.

7. A propulsion nozzle as claimed in claim 6 in which the position of said first link is unaffected by movement of said first series flap and said first and second links form part of parallel motion linkage through which said second series flap is connected to be parallel to said first link, so that the position of said second series flap is likewise unaffected by movement of said first series flap.

8. An adjustable propulsion nozzle as claimed in claim 1 in which the flaps of the second series are connected to the flaps of the first series solely by connecting means displaced from a pivotal axis between each pair of flaps about which the flaps pivot relatively to each other.

References Cited in the file of this patent

UNITED STATES PATENTS

| | | |
|---|---|---|
| 2,780,056 | Colley | Feb. 5, 1957 |
| 2,801,516 | Battle et al. | Aug. 6, 1957 |
| 2,846,843 | Clark et al. | Aug. 12, 1958 |
| 2,858,668 | Kelley et al. | Nov. 4, 1958 |